United States Patent
Wang et al.

(10) Patent No.: US 11,068,127 B2
(45) Date of Patent: Jul. 20, 2021

(54) SPRINGBOARD INTERFACE FOR QUICK TASK TRANSITIONS

(71) Applicant: Oracle International Corporation, Redwood Shores, CA (US)

(72) Inventors: Haiyan Wang, Parker, CO (US); Darryl Martin Shakespeare, Denver, CO (US)

(73) Assignee: Oracle International Corporation, Redwood Shores, CA (US)

( * ) Notice: Subject to any disclaimer, the term of this patent is extended or adjusted under 35 U.S.C. 154(b) by 263 days.

(21) Appl. No.: 15/796,520

(22) Filed: Oct. 27, 2017

(65) Prior Publication Data
US 2019/0129575 A1    May 2, 2019

(51) Int. Cl.
*G06F 3/0482* (2013.01)
*G06F 9/46* (2006.01)
*G06F 9/451* (2018.01)
*G06F 3/0484* (2013.01)

(52) U.S. Cl.
CPC ........ *G06F 3/0482* (2013.01); *G06F 3/04847* (2013.01); *G06F 9/451* (2018.02); *G06F 9/46* (2013.01)

(58) Field of Classification Search
CPC .... G06F 3/0482; G06F 3/04847; G06F 9/451; G06F 9/445; G06F 9/46
See application file for complete search history.

(56) References Cited

U.S. PATENT DOCUMENTS

| | | | | |
|---|---|---|---|---|
| 9,081,746 | B1* | 7/2015 | Helter | G06F 15/177 |
| 2005/0108396 | A1* | 5/2005 | Bittner | G06Q 10/06 709/225 |
| 2008/0016104 | A1* | 1/2008 | Kuehr-Mclaren | G06Q 10/06 |
| 2009/0113310 | A1* | 4/2009 | Appleyard | G06Q 10/00 715/742 |
| 2009/0199293 | A1* | 8/2009 | Song | G06F 21/604 726/18 |
| 2011/0179387 | A1* | 7/2011 | Shaffer | G06F 3/04883 715/835 |
| 2011/0265188 | A1* | 10/2011 | Ramaswamy | G06F 21/604 726/28 |
| 2011/0295852 | A1* | 12/2011 | Wang | G06F 16/9535 707/728 |
| 2012/0167094 | A1* | 6/2012 | Suit | G06F 9/46 718/100 |
| 2012/0210266 | A1* | 8/2012 | Jiang | H04N 21/233 715/772 |

(Continued)

*Primary Examiner* — David S Posigian
(74) *Attorney, Agent, or Firm* — Invoke

(57) ABSTRACT

Techniques for generating and presenting interfaces for navigating between different tasks and applications are disclosed. In one or more embodiments, a runtime interface is generated based on a set of one or more attributes associated with a user. Based on the attributes, a subset of applications of a plurality of applications included in a system are identified. In a first area of a display, a first application interface is displayed for interacting with a first application instance. Links to the subset of applications are concurrently displayed in a second area of the display. Responsive to receiving input selecting one of the links, a second application interface is displayed in the first area of the display while the links to the subset of applications remain in the second area of the display.

20 Claims, 9 Drawing Sheets

(56) References Cited

U.S. PATENT DOCUMENTS

| | | | |
|---|---|---|---|
| 2012/0290647 A1* | 11/2012 | Ellison | H04L 41/0233 709/203 |
| 2013/0067365 A1* | 3/2013 | Shrufi | G06F 3/048 715/764 |
| 2013/0138674 A1* | 5/2013 | Jeong | G06F 16/90335 707/758 |
| 2013/0268889 A1* | 10/2013 | Barak | G06F 3/048 715/825 |
| 2015/0324334 A1* | 11/2015 | Lee | G06F 17/28 715/208 |
| 2017/0185250 A1* | 6/2017 | Cho | G06F 9/445 |

* cited by examiner

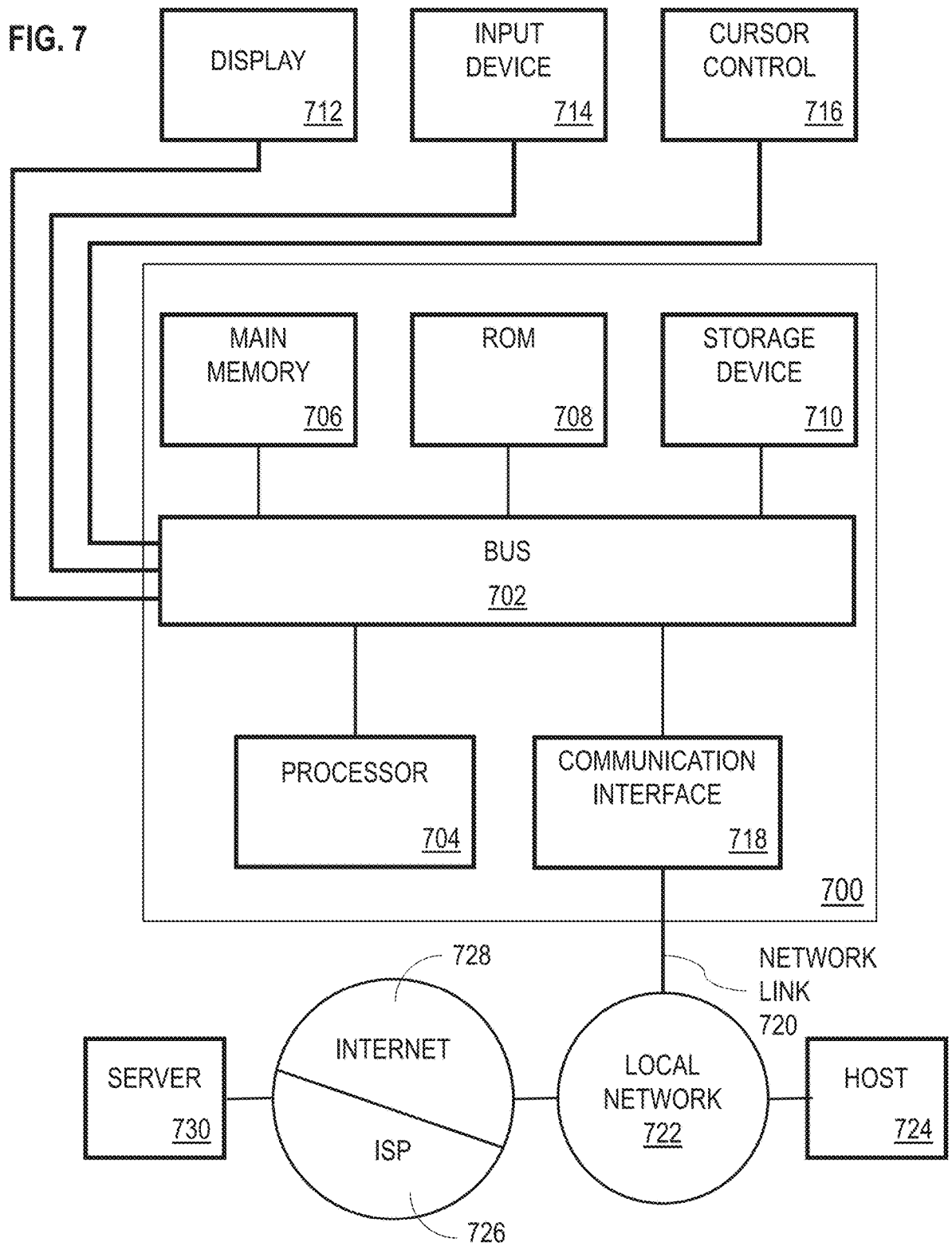

SPRINGBOARD INTERFACE FOR QUICK TASK TRANSITIONS

TECHNICAL FIELD

The present disclosure relates to the field of computer systems and more particularly to systems, software, and methods for navigating to between different applications.

BACKGROUND

Complex software systems are often comprised of several applications. For example, large-scale enterprise systems, such as enterprise resource planning (ERP) and information technology service management (ITSM) systems, may include a suite of several hundred or even thousands of applications that allow users to execute a variety of tasks. Due to the large number of available applications, navigation between the different tasks may present challenges. Poorly designed interfaces may make it difficult to locate and execute tasks, thereby leading to inefficient utilization of the suite of applications.

One approach for providing navigation is through a menu interface that groups and displays related tasks to an end user. A menu interface generally follows a top-down, hierarchical approach comprising menus and sub-menus, which may run several levels deep. Even though menus may be used to logically group and present applications within a software suite, the interface may still require a significant amount to locate a desired task. In software systems with hundreds or more of available applications, for instance, the user may be required to search through several menus and sub-menus within a menu hierarchy before locating a particular application. Even if the user knows the location of the application within the menu hierarchy, navigating to the application may involve several clicks, mouse-overs, and/or other inputs to reach. Once the menu interface closes, such as when a user selects a task from a sub-menu in the interface, the user may be required to repeat the navigation to reach the task again. Thus, the navigation process for menu interfaces may be cumbersome and inefficient, especially when the menu hierarchy involves several items and runs multiple levels deep.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 shows a block diagram that illustrates a computer system in accordance with one or more embodiments.

DETAILED DESCRIPTION

Figure 1:
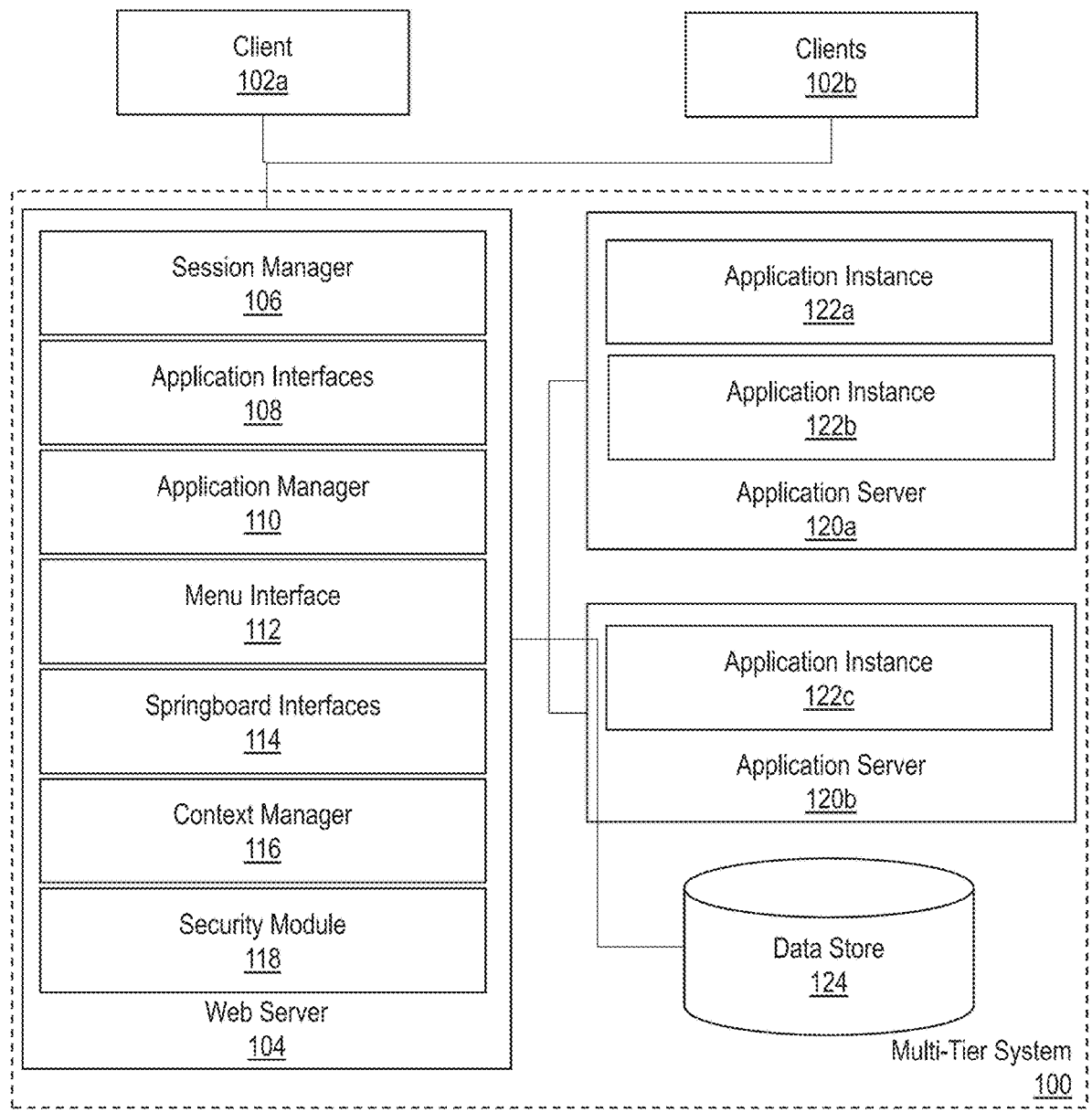
FIG. 1 illustrates a system for managing and presenting a springboard interface, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SPRINGBOARD INTERFACE INITIALIZATION
4. SPRINGBOARD PRESENTATION AND CONTEXTUAL NAVIGATION
5. CONTEXT SHARING AMONG APPLICATION INTERFACES
6. MENU INDEXING
7. COMPUTER NETWORKS AND CLOUD NETWORKS
8. HARDWARE OVERVIEW
9. MISCELLANEOUS; EXTENSIONS

1. General Overview

Techniques are described herein for generating, managing, and presenting a springboard interface that allows for quick transitions between different tasks. In one or more embodiments, the springboard interface comprises a graphical user interface (GUI) that provides links for accessing several different applications. A user may select one of the provided links to navigate to an interface that allows the user to interact with an application of interest. The selection may be performed via a single input, such as a click, without the need to browse through several different hierarchical levels or layers to find the application of interest.

When a user is interacting with an application via an application interface, the links provided through the springboard interface remain visible, according to one or more embodiments. The application interface may be displayed in one area of a display, such as through an application window, while the springboard interface provides links in a separate area of the display. Even if a user navigates away from the interface of one application to the interface of another application, the links provided by the springboard interface may remain visible in the same area of the display as previously presented. The user may quickly return to the first application interface by selecting a corresponding link from the springboard interface. The springboard interface may thus allow a user to navigate quickly, back and forth, between several applications, each of which may be tailored to perform/execute a distinct task or set of tasks.

The springboard interface may also store a context for the application interface, even if data entered through the application interface has not been committed or otherwise saved by the underlying application. After navigating away from an application instance, the user may subsequently return to an application interface having the same context as the user last left the interface before navigating away. For instance, the application interface may present the same data, view, and settings that the user most recently entered. As a result, the user may jump back and forth between instances of different applications without losing context.

Due to the relatively large number of applications is a complex software system, it may not be feasible to display links for all applications on a single display at a given moment in time. In order to maintain the number links presented to a manageable level, the springboard interface may select applications to present based on a variety of criteria. In one or more embodiments, the selection criteria may factor in user attributers. For instance, the springboard interface may identify a set of user attributes when a user first initiates a session. The springboard may then map the user attributes to a subset of applications to present to the end user. Applications that are not selected or otherwise included in the subset are not presented via the springboard interface.

The springboard interface may further restrict the links that are displayed to an end user based on a set of security policies. For example, a user or group of users may not have permission to access certain applications and tasks within a complex software system. The springboard interface may prevent an application from being presented or otherwise exposed to an end user that does not have security permissions to access the application.

A springboard interface may allow for new instances of an application to be opened or may switch between existing instances of different applications. In one or more embodiments, when a user selects a link to an application, the springboard interface determines whether an instance for that application exists as part of a user session. For example, an instance may have already been initiated based on a previous selection of the link or through some other interface. If an instance already exists, then the springboard interface does not instantiate a new application instance. Rather, the springboard interface may present an application interface connected to the existing instance of the application. Processing overhead may thereby be optimized by minimizing the number of unnecessary application instances that are instantiated and executed.

The springboard interface may also allow for context to be passed between instances of different applications. For example, data received or generated through one application interface may be shared with another application interface. Passing context allows for streamlined execution of tasks by applications added to the springboard interface, as described further below.

2. System Architecture

In one or more embodiments, a springboard interface is integrated into a multi-tier software architecture. Multi-tier architectures separate different processing functions into logical and/or physical structures referred to as tiers. For example, a multi-tier architecture may physically and logically separate presentation, application, and data processing. Each of these layers provides a distinct set of functions for processing requests received from one or more clients.

FIG. 1 illustrates example multi-tier system 100 in accordance with one or more embodiments. As illustrated in FIG. 1, multi-tier system 100 includes web server 104, application servers 120a-b, and data store 124. In one or more embodiments, multi-tier system 100 may include additional components or omit one or more components illustrated in FIG. 1. Components illustrated in FIG. 1 may be local to or remote from each other. For example, web server 100 may execute on a same server appliance as application server 120a, application server 120b and/or data store 124. The components illustrated in FIG. 1 may be implemented in software and/or hardware.

Web server 104 is part of the presentation tier in multi-tier system 100. Web server generally comprises:

Session manager 106 for managing connections between clients 102a-b and multi-tier system 100, including establishing and tearing down sessions;

Application interfaces 108 for interacting with applications hosted on application servers 120a-b;

Application manager 110 for registering and controlling access to applications that are available to clients 102a-b;

Menu interface 112 for logically grouping and presenting tasks and sub-tasks according to a menu hierarchy;

Springboard interface 114 for exposing a subset of applications from the menu interface for quicker access;

Context manager 116 for saving and passing context associated with the application interfaces; and Security module 118 for managing security policies and restricting access to application data based on defined filters.

Web server 104 may include other components that are not illustrated for purposes of brevity. In other embodiments, one or more components may be omitted from web server 104. Additionally or alternatively, each component of web server 104 may be distributed over multiple applications and/or machines. In other cases, components may be combined into one application and/or machine. Operations described with respect to one component may instead be performed by another component.

Although only one web server 104 is illustrated, multi-tier system 100 may include a plurality of web servers. In systems comprising multiple web servers, a load balancer may be deployed to distribute workload among the servers. For example, a load balancer may intercept requests from clients 102a-b and route them to the web server that may most efficiently process the request.

The interfaces in web server 104 may include hardware and/or software configured to facilitate communications between a client and system resources, such as an application. Each interface may render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, icons, buttons, toggles, text fields, date and time selectors, command lines, sliders, pages, and forms.

In one or more embodiments, menu interface 112 allows access to applications through dropdown lists and sub-lists that are organized through a menu hierarchy. Additionally or alternatively, springboard interface 114 may also provide access to applications by present links using other types of GUI elements, such as icons or buttons, that allow a user to select an application without the need to navigate through dropdown lists/menus. Springboard interface 114 may further present links from different vertical paths and subgroups within a menu hierarchy, and does not necessarily conform to a menu hierarchy. For example, springboard interface 114 may logically group and present applications/tasks that are not directly related and that are from different levels in the menu hierarchy. This allows springboard interface 114 to present groupings of tasks that may not be inherently interrelated.

Application servers 120*a-b* may each host one or more applications. During runtime, an application server may execute one or more instances of a hosted application. For example, application server 120 executes application instances 122*a-b*, and application server 120*b* executes application instance 122*c*. An application instance is an occurrence or realization of a program that is generated during runtime each time the program is run. A session may be associated with one or more application instances, including application instances 122*a-c*.

The applications within multi-tier system 100 may include, but are not limited to, built-in applications, custom applications and/or external applications. Built in applications refer to applications that are integrated directly into a software product/package by a provider. For example, an ERP system may be deployed with several built-in applications for performing various tasks related to managing resources. A user may augment the built-in applications with custom and/or external applications. Custom applications refer to applications that are created specifically for a user or group of users, such as users associated with a particular enterprise or department within an enterprise. Custom applications may be developed by the users themselves or any other source. Custom applications may be tailored to the users' specific environment and usage patterns. External applications include applications that are provided by third-party sources. These applications may be provided through third-party platforms and may be hosted on external servers. For example, the applications may include, but are not limited to applications provided through a cloud model, such as a Software-as-a-Service (SaaS) model. In other cases, the applications may be downloaded and installed within the same environment as the built-in applications.

In one or more embodiments, data repository 124 is any type of storage unit and/or device (e.g., a file system, database, collection of tables, or any other storage mechanism) for storing data. Further, data repository 124 may include multiple different storage units and/or devices. The multiple different storage units and/or devices may or may not be of the same type or located at the same physical site. Further, data repository 124 may be implemented or may execute on the same computing system as web server 104, application server 120*a*, and/or application server 120*b*. Alternatively or additionally, data repository 124 may be implemented or executed on a computing system separate from one or more of these components. A data repository 124 may be communicatively coupled to web server 104, application server 120*a*, and/or application server 120*b* via a direct connection or via a network. Data repository 124 may store application data, such as data records, reports, tables, and other data objects for applications executing the application tiers and/or the web tier.

One or more clients, including clients 102*a-b* may initiate sessions with multi-tier system 100 through client applications. Example client applications include, but are not limited to, web browsers, gateways, and desktop applications. A client may invoke any of the applications within multi-tier system 100 to which the client has secure access. For a given session, the client may initiate a single instance of an application or multiple instances of an application. In addition, the client may initiate instances of several different applications, which may all be associated with the same session.

Additional embodiments and/or examples relating to computer networks and computer systems are described below in Section 7, titled "Computer Networks and Cloud Networks" and Section 8, titled "Hardware Overview".

3. Springboard Interface Initialization

In one or more embodiments, springboard interface 114 is initialized when a user begins a new session within multi-tier system 100. During the initialization process, springboard interface 114 identifies a group of applications to make accessible to the end user and generates an interactive graphical interface based on the identified group of applications. The interactive graphical interface is then presented such that the end user may quickly access and navigate between the identified group of applications.

The initialization process of springboard interface 114 may be performed during runtime. For example, the GUI elements of springboard interface 114 may be selected, generated, and presented in a manner that varies from one session to another. The dynamic nature of the springboard interface 114 allows for multi-tier system 100 to adjust the look, feel, and functionality based on runtime attributes in a manner that optimizes task execution.

Figure 2:
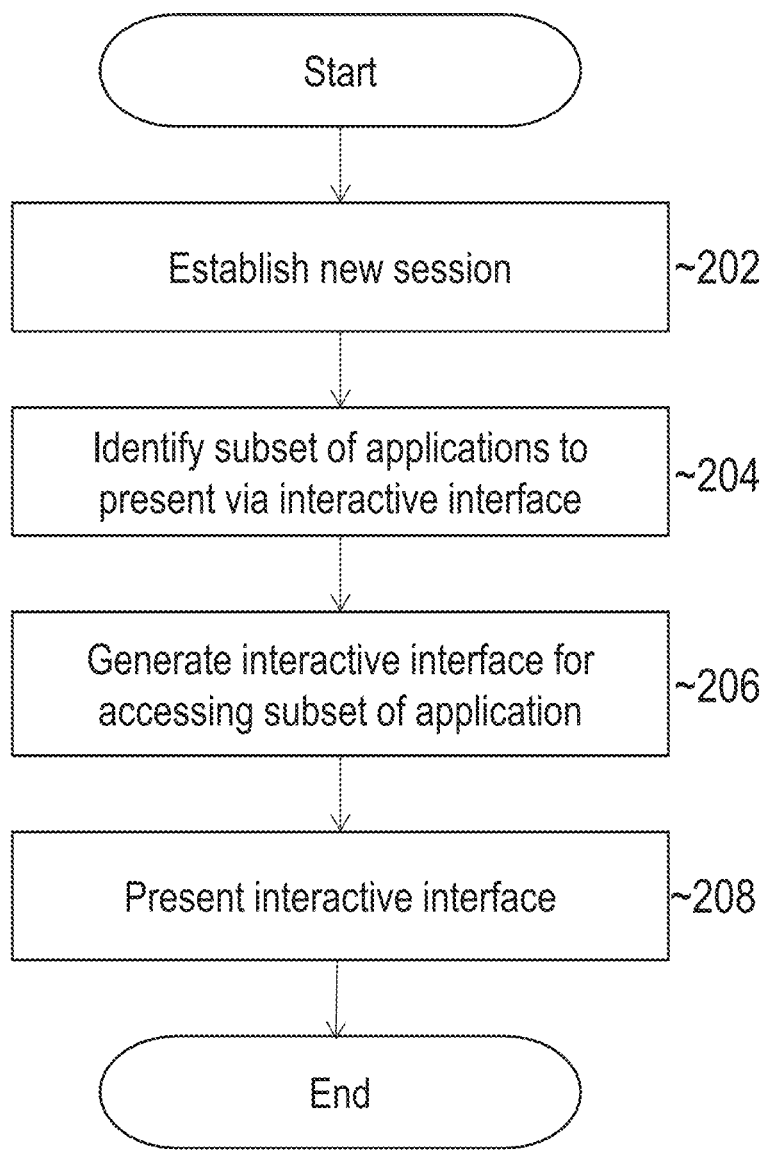
FIG. 2 illustrates an example set of operations for presenting a springboard interface, in accordance with one or more embodiments.

FIG. 2 illustrates an example set of operations for initializing a springboard interface, in accordance with one or more embodiments. The set of operations includes establishing a new session with a client (Operation 202). In one or more embodiments, establishing a new session includes authenticating a user. For example, the user may input a username, password, and/or other authentication credentials via one of clients 102*a-b*. Session manager 106 may receive the authentication information, and upon validation, establish a new session with the requesting client.

In one or more embodiments, a session is associated with a session token, such as a hypertext transfer protocol (HTTP) token or some other session identifier to facilitate session management. Session manager 106 may generate the session ID when establishing a new session for a user/client. The session ID may be returned to the requesting client and stored, such as in an HTTP cookie. Subsequent requests may include the session ID to allow for stateless request processing by web server 104.

Referring again to FIG. 2, the set of operations further comprises identifying a subset of applications to present via springboard interface 114 (Operation 204). As previously indicated, multi-tier system 100 may include a significant number of applications. In such cases, it may not be feasible to present links to every available application through springboard interface 114. The subset of applications may be identified and selected to increase task efficiency. For example, applications may be selected based on the likelihood that a user will access the application. Applications with little or no likelihood of being accessed may be omitted, while those with a high likelihood of being accessed may be included among the subset.

In one or more embodiments, applications are selected for inclusion via springboard interface 114 based on one or more user attributes. Example user attributes may include, but are not limited to, a user's role, access patterns, preferences, and security permissions. These attributes may be indicative of the applications that a user is likely to access. For example, in an ITSM system, a user that has a role of database administrator (DBA) may be more likely to access applications related to managing database resources, whereas a network manager may be more likely to access applications related to network resources. An ERP system may have other roles, such as an accounts payable manager, an accounts receivable manager, an asset manager, etc. Springboard interface 114 may select different applications for different user roles. Thus, an accounts payable manager may not see the same applications as an accounts receivable manager, although one or more applications presented through the springboard interface may overlap. The number and type of user roles may vary from implementation to implementation.

As indicated above, springboard interface 114 may additionally or alternatively select applications to present based on access patterns. For example, springboard interface 114 may be configured to present the application most frequently used by an individual user or by users sharing a common role. Springboard interface 114 may maintain statistics, such as a count value that is periodically reset or decremented, for each application to track the frequency of access. The applications with the highest value may be selected for presentation. As the access patterns evolve over time, the springboard interface 114 may be automatically updated. If an application is no longer being accessed, then springboard interface 114 may replace the application with another that is more frequently accessed.

Springboard interface 114 may additionally or alternatively select applications to present based on user preferences, which may be defined with respect to user groups (e.g., via user roles) and/or individual users. User preferences may be determined based on feedback or other input received from application users. For example, users may explicitly select applications that the user would like to include on the springboard interface. As another example, users may rate applications. Highly rated applications may be included on the springboard, whereas poorly rated applications may be omitted.

Springboard interface 114 may additionally or alternatively select applications based on security permissions. Security policies or filters may be defined for individual users and/or for groups of users, such as by user role. For example, a system administrator may define a security filter that restricts access to a set of applications to users with a database administrator role. Users that do not have a matching role (e.g., role="DBA") may be prevented from accessing these applications. The subset of applications may thus exclude applications that the user is not authorized to access.

The number of applications included in the subset may vary depending on the particular implementation. In some cases, only a single application may be included. In other cases, a dozen or more applications may be included. A threshold limit may be defined to avoid excessive cluttering, which may complicate navigation between different tasks.

Referring again to FIG. 2, the set of operations further comprises generating an interactive interface for accessing the subset of applications (Operation 206). The interactive interface may vary from one session to the next based on the subset of applications that were identified for presentation. In one or more embodiments, the interactive interface presents each application using one or more graphical elements, such as icons or any of the other GUI elements previously described. The graphical element may include embedded links for accessing a corresponding application in the subset of applications. A link may identify the location of an application interface or instructions for generating an application interface.

In one or more embodiments, application manager 110 maintains a mapping between applications and corresponding graphical elements. For example, application manager 110 may map a unique application identifier, such as an application name and/or other attributes, to a corresponding icon. Additionally or alternatively, application manager 110 may map each application identifier to a link for invoking an application interface. Springboard interface 114 may access the mapping during runtime to determine which icons and links to include in the interactive interface.

Springboard interface 114 may include one or more link types. Example link types may include, but are not limited to, file paths where the application interface is stored, dynamic URLs to an interface (i.e., URLs where the host, port, and/or context root might change), and static URLs (i.e., URLs where the host, port, and context root do not change). A URL link may connect to an external interface residing outside of the multi-tier software system, which may be used to integrate third-party applications. In other cases, a URL link may connect to an application interface available internally, such as an interface for a built-in application.

Referring again to FIG. 2, the set of operations further comprises presenting the interactive interface for accessing the subset of applications to an end user (Operation 208). For example, the interactive interface may be returned by web server 104 to one of clients 102a-b and rendered for display to an end user.

In one or more embodiments, the interactive interface includes a link for each of the subset of applications. The interactive interface may allow the user to navigate between the different applications to perform different tasks with minimal input. For example, the user may navigate to an interface for an application with a single click (or other input) of a graphical element corresponding to the application. Example interface layouts are presented in the section below.

4. Springboard Presentation and Contextual Navigation

Figure 3A:
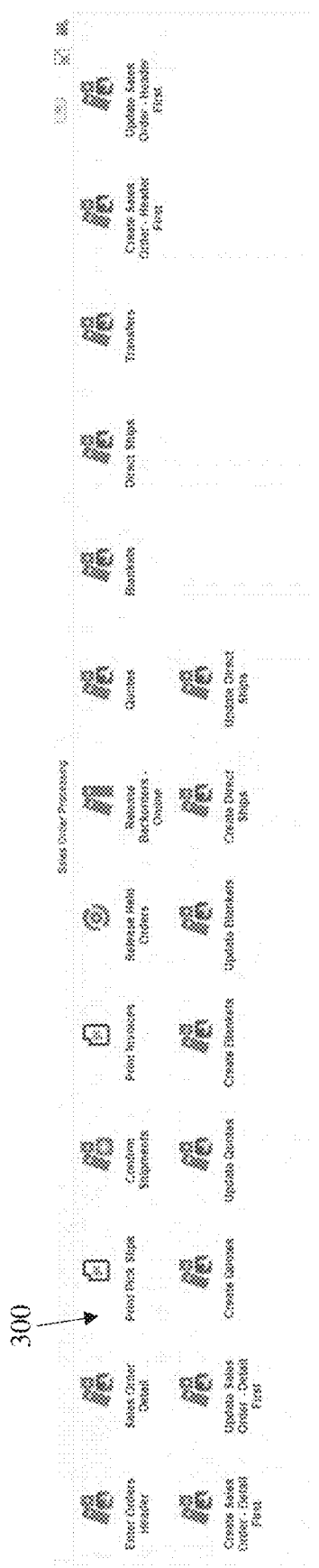
FIG. 3A illustrates example landing page including a springboard interface, in accordance with one or more embodiments.

When a user first initiates a session with multi-tier system 100, springboard interface 114 may be presented as or in conjunction with a landing page. By integrating the springboard interface into a landing page, the user may quickly launch instances of applications/tasks that are most relevant to and likely to be accessed by the user. FIG. 3A illustrates example landing page including springboard interface 300, in accordance with one or more embodiments. Springboard interface 300 includes several different applications related to sales order processing. For example, by clicking on or otherwise selecting the icon with the label "Enter Orders Header", a new application instance for generating new order headers may be launched. Any of the other icons may also be selected to launch instances of other corresponding applications. The applications that are displayed via the landing page may vary based on runtime attributes (e.g., user roles, access patterns, preferences, security permissions, etc.) as previously described.

Figure 3B:
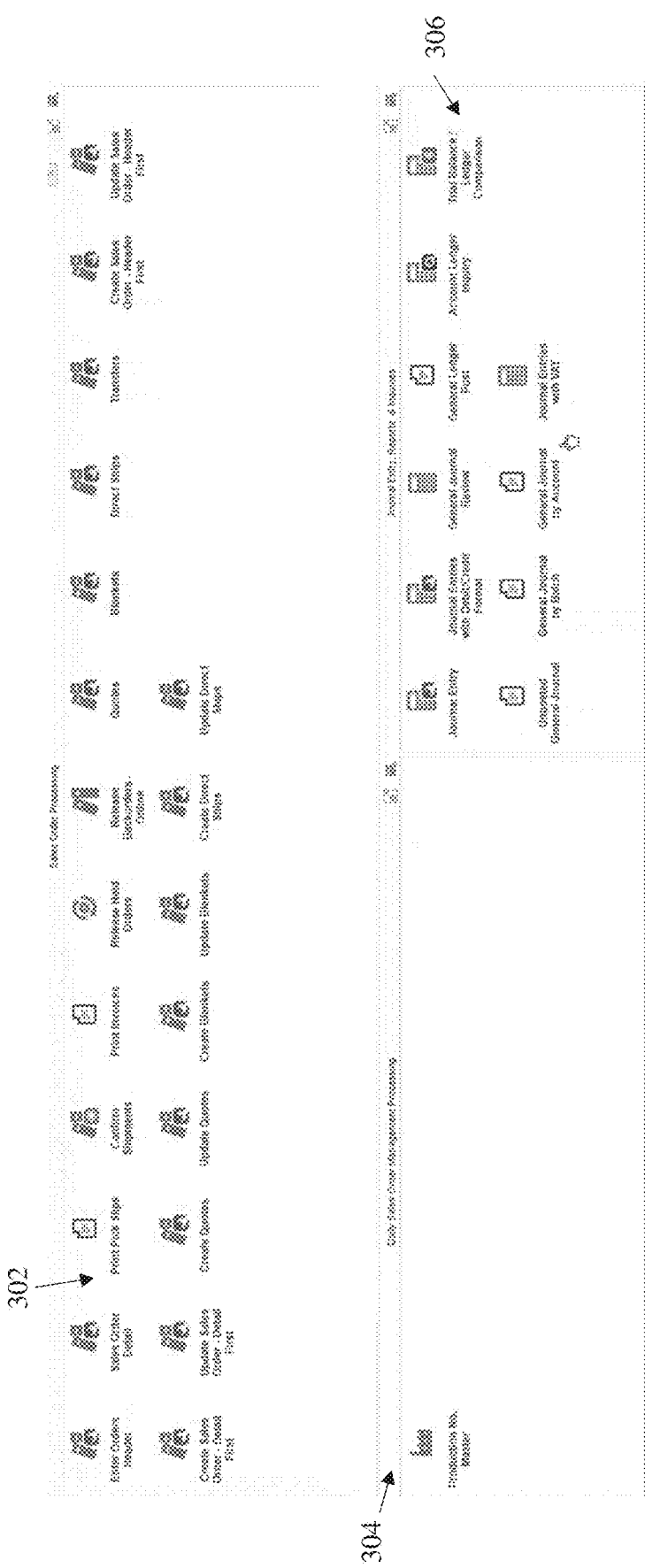
FIG. 3B illustrates an example landing page including several different springboard interfaces, in accordance with one or more embodiments.

In FIG. 3A, the landing page includes a single instance of a springboard interface (i.e., springboard interface 300). In other instances, a landing page may include a plurality of springboard interfaces. For example, FIG. 3B illustrates an example landing page including several different springboard interfaces, in accordance with one or more embodiments. The landing page includes springboard interface 302, which includes the same links as springboard interface 300. The landing page also includes springboard interface 304 and springboard interface 306. Each springboard interface presents a different set of applications that have been logically grouped together. In the present example, springboard interface 302 presents applications related to sales order processing, springboard interface 304 presents a single application related to daily sales order management processing, and springboard interface 306 presents applications related to performing journaling operations.

Upon selecting an item from one of springboard interfaces 300, 302, 304 or 306, the user is presented with an application interface. The application interface that is presented allows the user to interact with an instance of a corresponding application, which may be executed locally or on another network host.

Application interfaces may vary from one application to the next. In one or more embodiments, an application interface is a page, such as a webpage, comprising one or more GUI elements that are capable of receiving input from the user. Additionally or alternatively, an application interface may interact with an instance of the application by invoking libraries and frameworks of the application as provided through an application programming interface (API). For example, the application interface may invoke specific subroutines, passing arguments and/or other parameters, according to protocols defined by the API.

Figure 4A:
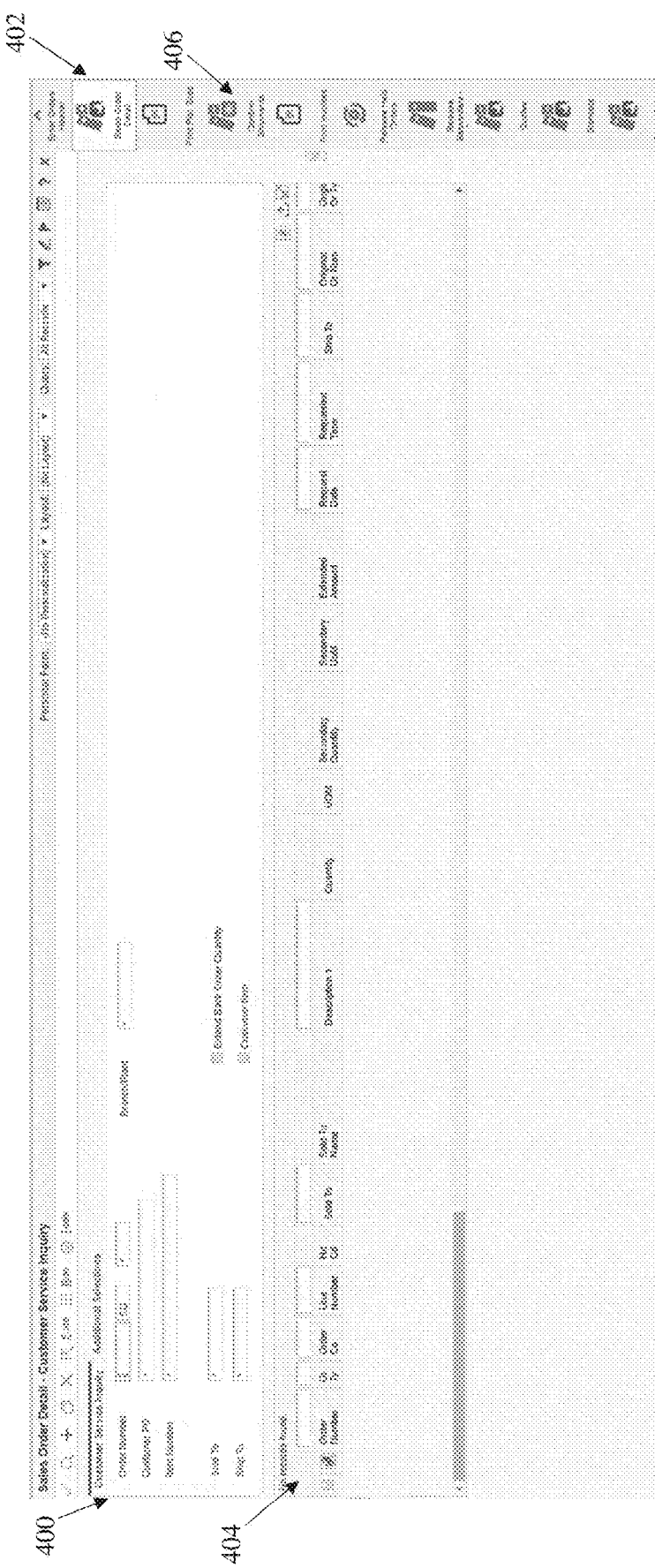
FIG. 4A illustrates an example application interface for interacting with an application while a springboard interface is concurrently displayed, in accordance with one or more embodiments.

FIG. 4A illustrates example application interface 400 for interacting with an application while springboard interface 402 is concurrently displayed, according to one or more embodiments. Application interface 400 is presented in an application window in one area of the screen, and springboard interface 402 is presented in a navigation pane/window in an area of the screen abutting the application window. Application interface 400 includes various entry fields for searching for and viewing details of sales orders. For example, the user may input attributes such as the order number, a customer purchase order number, the item number, etc. Upon entering information through application interface 400, a request may be generated and sent to an instance of a sales order application. The sales order application may use the information to retrieve records from the data tier, if any, and return the data records to application interface 400. The matching records may be displayed in area 404.

Figure 4B:
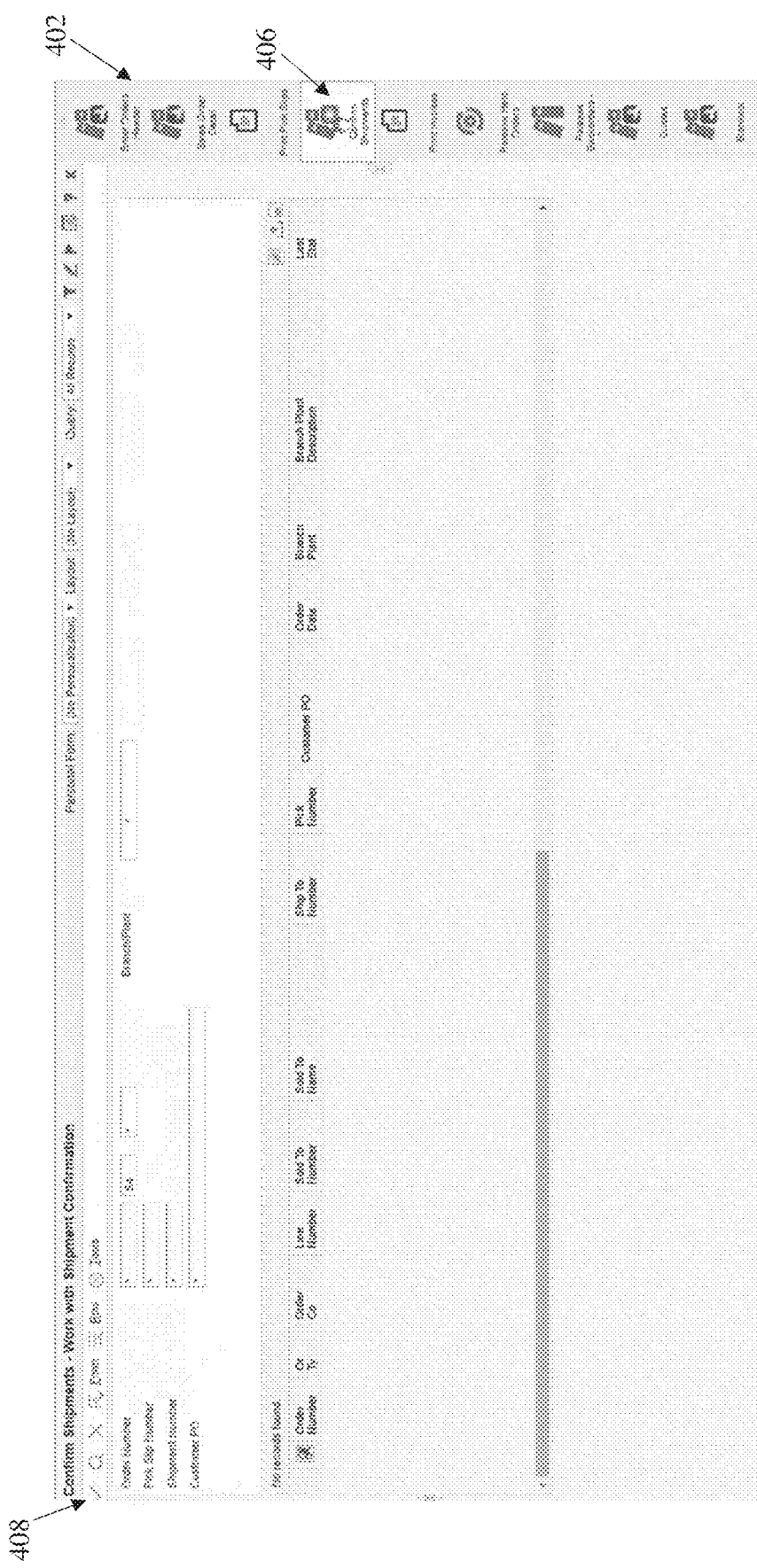
FIG. 4B illustrates an example application interface for interacting with an application while a springboard interface remains concurrently displayed, in accordance with one or more embodiments.

FIG. 4B illustrates an example application interface 408 for interacting with another application while springboard interface 402 remains displayed. Application interface 408 is displayed responsive to input selecting link 406 from springboard interface 402. Application interface 408 includes a different set of fields for performing tasks related to confirming shipments. In this case, application interface 408 connects to an instance of a different application than application interface 400. The separate application instances may be executed on the same or a different application server. One or more of the application instances may be executed by an external server, such as a cloud server provided by a third-party host.

In one or more embodiments, springboard interface 402 allows a user to scroll if the subset of applications are not able to all fit within the allocated display area at the same time. For example, springboard interface 402 may include the same application links as springboard interface 302. As can be seen, several of the links presented on the landing page are not able to be viewed when an application window/interface is concurrently displayed. A user may scroll up or down to view other applications included in the springboard interface.

In one or more embodiments, a user may navigate to applications via a menu interface in addition to the springboard interface. The menu interface may comprise multiple sub-menus or levels, grouping application according to a menu hierarchy. The menu interface may include applications that were not included in a springboard interface. For example, the springboard interface may exclude links to applications that a user is unlikely to access. These applications may instead be accessed by navigating the menu interface.

Figure 5:
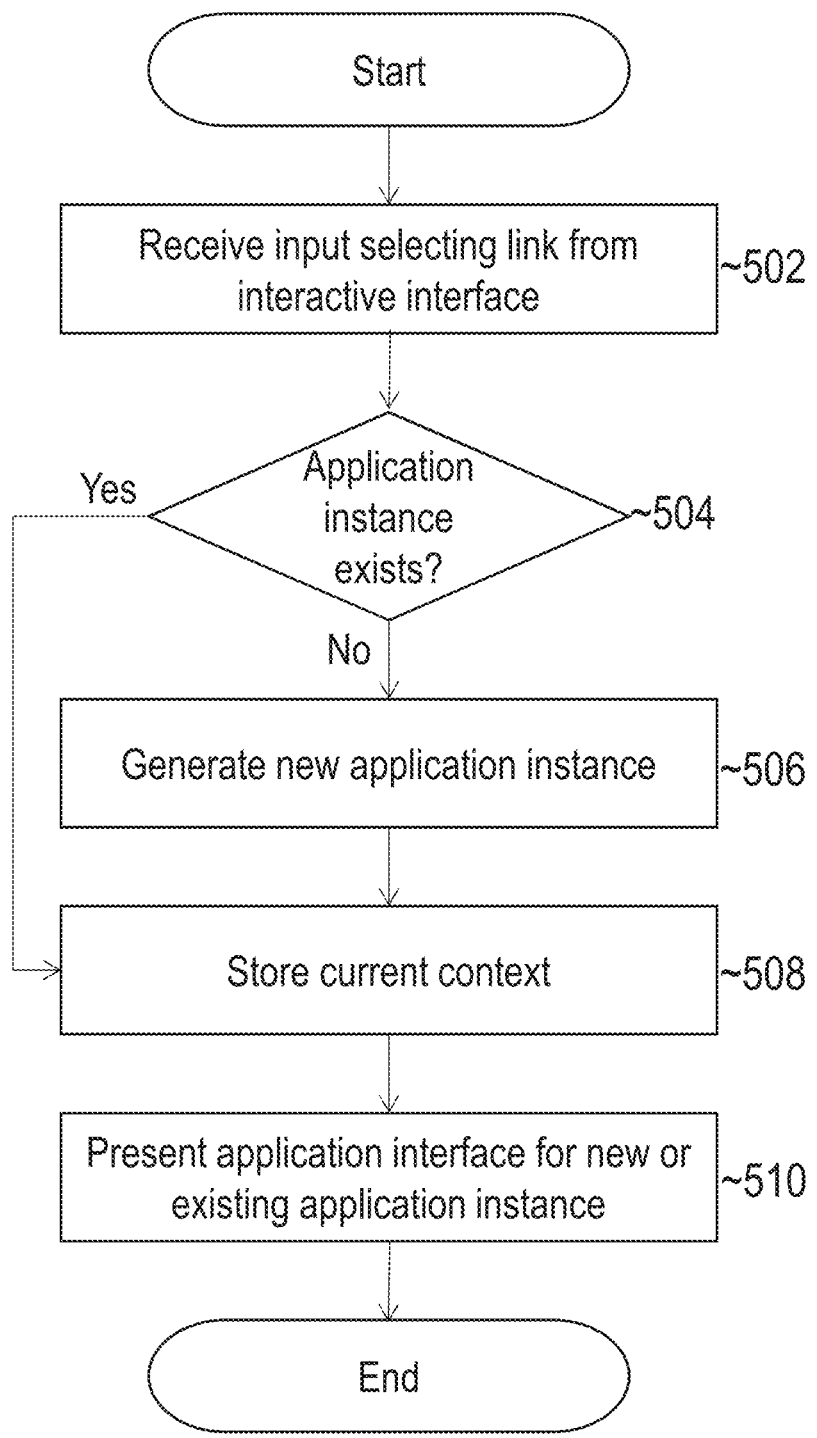
FIG. 5 illustrates an example set of operations for navigating between different applications via a springboard interface, in accordance with one or more embodiments.

FIG. 5 illustrates an example set of operations for navigating between different applications via a springboard interface, in accordance with one or more embodiments. The set of operations includes receiving input selecting a link from a springboard interface (Operation 502). For example, a user may click on or otherwise select any of the links from springboard interface 402 or those presented in a landing page.

Responsive to receiving input selecting a link, the process determines whether an instance of the application corresponding to the selected link already exists for the session (Operation 504). If an instance already exists, then the process may proceed without creating a new application instance. This may facilitate navigation and reduce processing overhead that would be incurred by creating a new application instance each time a link is selected. In other embodiments, the springboard interface may be configured to launch a new instance of an application each time a link is selected, even if an application instance already exists.

If an application instance does not yet exist for the session, then the set of operations includes generating a new instance for the application represented by the link (Operation 506). For example, if a link to a forecasting application is selected, then a new instance of the forecast application for the session may be brought up on one of application servers 120a-b.

The set of operations further includes storing a context for the application interface, if any, that was being accessed when the input was received (Operation 508). In one or more embodiments, the context includes data input by a user through the application interface. Referring to FIG. 4A, for example, the user may have input an order number and/or other data into the corresponding fields before selecting link 406. Results may also have been returned by the application and displayed in area 404. Context manager 116 may generate context data based on the current state of the interface and store the data in volatile and/or non-volatiles storage. If navigating away from a landing page, then operation 508 may be omitted.

The set of operations further includes presenting an application interface for interacting with an instance of the selected application (Operation 510). In the example given above with reference to FIG. 4B, for instance, the application interface 408 may be displayed responsive to input selecting link 406.

In one or more embodiments, context manager 116 may check if any context data has been stored for the application interface. If context data is available, then it may be incorporated into the application interface that is presented to the end user at operation 510. For example, if a user navigates back to application interface 400, context manager 116 may populate the fields and search results such that the application interface is presented with the same data and in the same state as the user last left the interface before navigating away.

In one or more embodiments, context manager 116 stores context data that has not yet been captured by an underlying application. For example, a user may have input data, through an application interface, to create a new record or modify an existing record. If the user navigates away from the interface before completing the new entry or modification, then the application may not have received the data or committed the data to persistent storage. However, context manager 116 may store this data to allow the user to complete the task without having to reenter the information.

User preferences may also affect the presentation of springboard and application interfaces. For example, a set of users may specify different language preferences. The springboard interface may be generated at runtime to match each of the user's preferences. If a user's preferred language is Chinese, for instance, then the set of links and application interfaces that are presented may have text/characters in Chinese. Another user may have the same user role but have a preferred language of English. In this case, the same set of applications may be selected for inclusion in the springboard interface. However, the links and application interfaces may be presented in English. Additionally or alternatively, other types of user preferences may affect the generation and presentation of interfaces during a session. For example, user presences may affect the display area, icon sizes, and/or one or more other display attributes of a springboard interface.

5. Context Sharing Among Application Interfaces

In one or more embodiments, the context of one application interface affects the display and presentation of another application interface. For example, an application interface may receive user input for entering text in one or more fields and/or accessing data objects. The user may subsequently navigate to another application interface by selecting a link on a springboard interface. Upon selecting the link, context manager 116 may pass the current context, including the entered text and/or selected objects, to the application interface for the selected link. The text and/or object accessed through the previously viewed application interface may then be presented or otherwise made available to new application interface.

Referring to FIG. 4A, for instance, a user may input data such as an order ID and item ID. The user may further be presented with one or more records in display area 404. If the user then selects link 406 to confirm shipments, the user may be presented with application interface 408. However, rather than presenting application interface 408 with blank fields, context manager 116 may populate the interface with the order ID and item ID information entered through application interface 400.

In other cases, object references may be passed between different application interfaces. For example, one available application may perform analytics to determine whether a software resource drifts from a recommended standard. The user may specify which resource to analyze by providing a reference to a particular object identifying a configuration level of the software resource. The user may then navigate, through the springboard interface, to a second application interface that connects to a forecasting application. The springboard interface may add the resource reference to the second application interface to allow the user to instantly run forecast scenarios for the resource, such as projections of future utilization and performance metrics. This allows a user to quickly execute a variety of tasks on an object that is accessible across multiple applications.

6. Menu Indexing

In one or more embodiments, multi-tier system 100 generates an index that maps runtime attributes to a subset of applications. For example, a menu index may map a user role and language preference to application names, references, and/or other values that uniquely identify the subset of applications. When a user initiates a session, the springboard interface may search for a menu index matching the attributes of the user. If a match is found, then the springboard interface may determine which subset of applications have been mapped to the user attributes. The menu index avoids the need to filter through every application each time a new instance of a springboard interface is generated. Thus, springboard interfaces may be more efficiently generated and presented during runtime.

Figure 6:
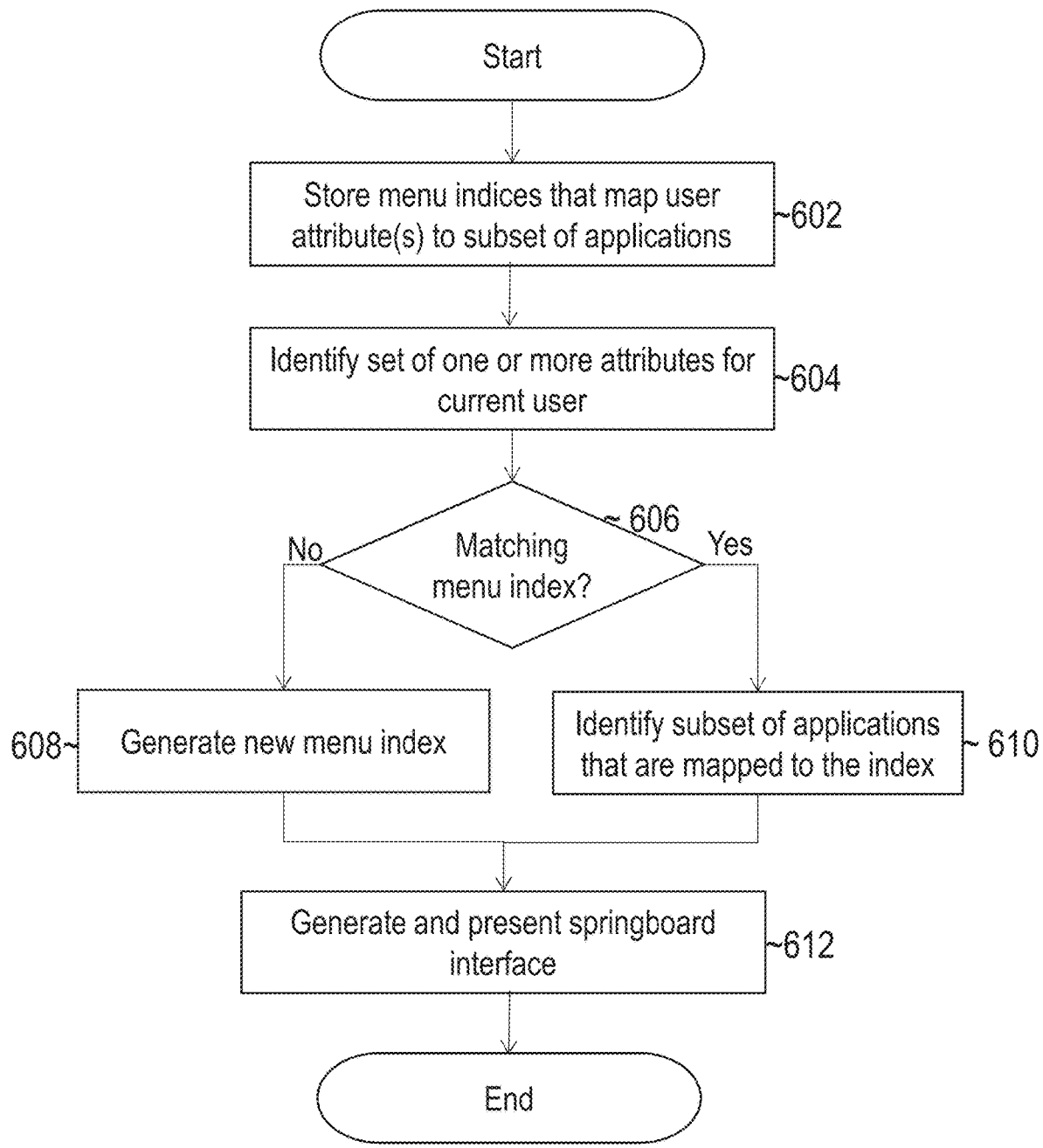
FIG. 6 illustrates an example set of operations for presenting a springboard interface using a menu index, in accordance with one or more embodiments.

FIG. 6 illustrates an example set of operations for presenting a springboard interface using a menu index, in accordance with one or more embodiments. The set of operations includes storing a set of menu indices that map individual or combinations of user attributes to a subset of applications that are available within a menu hierarchy (Operation 602). In one or more embodiments, the menu indices are stored in a table. For example, each record in the table may correspond to a different menu index. However, other data structures, such as linked lists and trees, may also be used, depending on the particular implementation.

The set of operations further comprises identifying a set of one or more user attributes for a user that is logged in to a session with multi-tier system 100 (Operation 604). The user attributes that are identified may vary from implementation to implementation. As previously indicated, example user attributes may include, but are not limited to user roles, access patterns, preferences, and security permissions. These attributes may be maintained by the system in a user profile.

The set of operations further comprises searching the menu indices to determine whether a menu index exists that maps the one or more user attributes to a subset of applications (Operation 606). For example, if the menu indices are stored in a table, then the process may search for a record having user attribute values matching those identified at Operation 604. If no records have matching values, then the menu index is determined not to exist.

If a menu index does not exist, then the process generates a new menu index that maps the user attributes to a subset of applications (Operation 608). In one or more embodiments, the new menu index is built by traversing the entire menu hierarchy/tree of applications within multi-tier system 100 and applying a set of filters to select the subset of applications. The filters may apply any of the selection criteria previously described, which may be based on one or more user attributes. The newly generated menu index may be added to as an entry to a table or other data structure that stores the set of menu indices.

If the menu index exists, then the set of operations includes identifies the subset of applications that are mapped by the index (Operation 610).

Once the subset of applications has been identified, either via the menu index of filtering, the process generates and presenting a springboard interface that includes links to the subset of applications (Operation 612).

In one or more embodiments, menu indices are shared across different user sessions by users having common attributes. For example, if a new user having a particular role and language preference initiates a new session, there might not be a menu index generated yet. A menu index may be generated according to the process depicted in FIG. 6. Another user may subsequently initiate a session. If the subsequent user has a common user role and language preference, then the same menu index may be used to generate the springboard interface.

Applications within a menu hierarchy may be added, updated, or deleted over time. With any modification, a system administrator may rebuild the affected submenus via a system administration application. Additionally or alternatively, a menu index may also be pre-generated or rebuilt for selected user roles and/or other user attributes. The update may be triggered automatically upon detecting a change or may be performed through the system administrator application.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause operations comprising:
   storing a mapping between user attributes and a plurality of menu indices, wherein each menu index in the plurality of menu indices includes links to at least a subset of applications of a plurality of applications in a system;
   determining a set of attributes associated with a user that has initiated a session with the system that includes the plurality of applications;
   identifying a plurality of links to present to the user, wherein the plurality of links are included in a menu index mapped to the set of attributes associated with the user and provide access to a first subset of applications, of the plurality of applications, that are most frequently accessed by users sharing the set of attributes;
   presenting, in a first area of a display, a first application interface for interacting with an instance of a first application in the first subset of applications and, concurrently in a second area of the display, the plurality of links to the first subset of applications that are most frequently accessed by users sharing the set of attributes;
   passing a first context for data entered in the first application interface that has not been committed by the first application to at least a second application in the first subset of applications that are most frequently accessed by users sharing the set of attributes, wherein the first context includes a reference to access an object and an uncommitted change to the object, wherein the user provides the reference to access the object to the first application, wherein the object is accessible to the plurality of applications;

receiving, from the user while the first application interface for interacting with the instance of the first application of the first subset of applications is displayed in the first area of the display, first input selecting a link from the plurality of links displayed in the second area of the display;

responsive to receiving the first input selecting the link from the plurality of links, presenting, in the first area of the display, a second application interface for interacting with an instance of the second application in the first subset of applications, and, concurrently in the second area of the display, at least a subset of the plurality of links, wherein the second application interface presents one or more user interface elements based at least in part on the first context for the data entered in the first application interface that has not been committed by the first application, wherein the second application presents the reference to access the object extracted from the first context via the second application interface and a set of one or more analytic operations available to execute on the object using the reference;

receiving second input through the second application interface;

responsive to the second input executing at least one analytic operation in the set of one or more analytic operations on the object using the reference to access the object extracted from the first context; and passing a second context for data entered in the second application interface that has not been committed by the second application to at least the first application in the subset of applications, wherein the first application interface is updated based on the second context.

2. The one or more non-transitory computer-readable media of claim 1, wherein the instructions further cause operations comprising responsive to receiving the first input selecting the link from the plurality of links, determining whether the instance of the second application exists for the session; if the instance of the second application exists for the session, presenting the second application interface for interacting with the instance of the second application without generating a new instance of the second application for the session; and if the instance of the second application does not exist for the session, generating a new instance of the second application for the session.

3. The one or more non-transitory computer-readable media of claim 1, wherein the data entered in the first application is for creating or modifying at least one object accessible to the first application; wherein creation or modification of the at least one object is not committed by the first application responsive to receiving the first input selecting the link from the plurality of links.

4. The one or more non-transitory computer-readable media of claim 3, wherein the instructions further cause operations comprising: returning to the first application interface responsive to a third input selecting a second link from the plurality of links; wherein the data for creating or modifying the at least one object is displayed in the first application interface; and creating or modifying the at least one object by the first application in response to a fourth input received through the first application interface.

5. The one or more non-transitory computer-readable media of claim 1, wherein the first subset of applications are also accessible through a menu interface that is displayed in a third area of the display; wherein the menu interface further includes links to applications that are not in the first subset of applications.

6. The one or more non-transitory computer-readable media of claim 1, wherein the first subset of applications includes at least one custom application generated by the user.

7. The one or more non-transitory computer-readable media of claim 1, wherein the first application is a cloud services application; wherein the first application interface connects with the instance of the first application through one or more data communication networks.

8. The one or more non-transitory computer-readable media of claim 1, wherein the set of attributes identify a role associated with the user; wherein the first subset of the plurality of applications to present to the user are selected based on the role associated with the user.

9. The one or more non-transitory computer-readable media of claim 1, wherein the menu index is shared with one or more other users that have the set of attributes.

10. The one or more non-transitory computer-readable media of claim 1, the instructions further causing operations comprising: detecting a modification to a menu hierarchy; responsive to detecting the modification to the menu hierarchy, rebuilding the menu index.

11. The one or more non-transitory computer-readable media of claim 1, the instructions further causing operations comprising receiving a set of security filters for a particular user role; and preventing at least one application of the plurality of applications from being accessed by the user based on the set of security filters.

12. The one or more non-transitory computer-readable media of claim 1, the instructions further causing operations comprising selecting a format for presenting the plurality of links based on the set of attributes associated with the user.

13. The one or more non-transitory computer-readable media of claim 12, wherein the format includes a language in which to display text associated with the plurality of links.

14. The one or more non-transitory computer-readable media of claim 1, wherein the instructions further cause operations comprising selecting a format for the first application interface based on the set of attributes associated with the user.

15. The one or more non-transitory computer-readable media of claim 1, wherein the set of attributes associated with the user include a user role, an access pattern for the user, and security permissions for the user.

16. The one or more non-transitory computer-readable media of claim 1, wherein a filter restricts users that do not match a database administrator role from accessing at least one application in the plurality of applications; wherein the at least one application is not included in the subset of applications.

17. The one or more non-transitory computer-readable media of claim 1, wherein the instructions further cause populating the one or more user interface elements based on at least a portion of the data entered in the first application interface that has not been committed by the first application.

18. The one or more non-transitory computer-readable media of claim 1, wherein the reference to the object is a reference for a software resource; wherein the first application performs analytics to determine whether the software resource drifts from a recommended standard; wherein a springboard interface adds the reference to the object to the second application interface; wherein the set of one or more analytic operations includes a forecast for the software resource identified by the reference to the object.

19. A system comprising:
  one or more hardware processors;

one or more non-transitory computer readable media storing instructions, which, when executed by the one or more hardware processors cause operations comprising:
    storing a mapping between user attributes and a plurality of menu indices, wherein each menu index in the plurality of menu indices includes links to at least a subset of applications of a plurality of applications in a system;
    determining a set of attributes associated with a user that has initiated a session with the system that includes the plurality of applications;
    identifying a plurality of links to present to the user, wherein the plurality of links are included in a menu index mapped to the set of attributes associated with the user and provide access to a first subset of applications, of the plurality of applications, that are most frequently accessed by users sharing the set of attributes;
    presenting, in a first area of a display, a first application interface for interacting with an instance of a first application in the first subset of applications and, concurrently in a second area of the display, the plurality of links to the first subset of applications that are most frequently accessed by users sharing the set of attributes;
    passing a first context for data entered in the first application interface that has not been committed by the first application to at least a second application in the first subset of applications that are most frequently accessed by users sharing the set of attributes, wherein the first context includes a reference to access an object and an uncommitted change to the object, wherein the user provides the reference to access the object to the first application, wherein the object is accessible to the plurality of applications;
    receiving, from the user while the first application interface for interacting with the instance of the first application of the first subset of applications is displayed in the first area of the display, first input selecting a link from the plurality of links displayed in the second area of the display;
    responsive to receiving the first input selecting the link from the plurality of links, presenting, in the first area of the display, a second application interface for interacting with an instance of the second application in the first subset of applications, and, concurrently in the second area of the display, at least a subset of the plurality of links, wherein the second application interface presents one or more user interface elements based at least in part on the first context for the data entered in the first application interface that has not been committed by the first application, wherein the second application presents the reference to access the object extracted from the first context via the second application interface and a set of one or more analytic operations available to execute on the object using the reference;
    receiving second input through the second application interface;
    responsive to the second input, executing at least one analytic operation in the set of one or more analytic operations on the object using the reference to access the object extracted from the first context; and
    passing a second context for data entered in the second application interface that has not been committed by the second application to at least the first application in the subset of applications, wherein the first application interface is updated based on the second context.

20. A method comprising:
    storing a mapping between user attributes and a plurality of menu indices, wherein each menu index in the plurality of menu indices includes links to at least a subset of applications of a plurality of applications in a system;
    determining a set of attributes associated with a user that has initiated a session with the system that includes the plurality of applications;
    identifying a plurality of links to present to the user, wherein the plurality of links are included in a menu index mapped to the set of attributes associated with the user and provide access to a first subset of applications, of the plurality of applications, that are most frequently accessed by users sharing the set of attributes;
    presenting, in a first area of a display, a first application interface for interacting with an instance of a first application in the first subset of applications and, concurrently in a second area of the display, the plurality of links to the first subset of applications that are most frequently accessed by users sharing the set of attributes;
    passing a first context for data entered in the first application interface that has not been committed by the first application to at least a second application in the first subset of applications that are most frequently accessed by users sharing the set of attributes, wherein the first context includes a reference to access an object and an uncommitted change to the object, wherein the user provides the reference to access the object to the first application, wherein the object is accessible to the plurality of applications;
    receiving, from the user while the first application interface for interacting with the instance of the first application of the first subset of applications is displayed in the first area of the display, first input selecting a link from the plurality of links displayed in the second area of the display;
    responsive to receiving the first input selecting the link from the plurality of links, presenting, in the first area of the display, a second application interface for interacting with an instance of the second application in the first subset of applications, and, concurrently in the second area of the display, at least a subset of the plurality of links, wherein the second application interface presents one or more user interface elements based at least in part on the first context for the data entered in the first application interface that has not been committed by the first application, wherein the second application presents the reference to access the object extracted from the first context via the second application interface and a set of one or more analytic operations available to execute on the object using the reference;
    receiving second input through the second application interface;
    responsive to the second input, executing at least one analytic operation in the set of one or more analytic operations on the object using the reference to access the object extracted from the first context; and
    passing a second context for data entered in the second application interface that has not been committed by the second application to at least the first application in the subset of applications, wherein the first application interface is updated based on the second context.

\* \* \* \* \*

UNITED STATES PATENT AND TRADEMARK OFFICE
CERTIFICATE OF CORRECTION

PATENT NO. : 11,068,127 B2  Page 1 of 1
APPLICATION NO. : 15/796520
DATED : July 20, 2021
INVENTOR(S) : Wang et al.

It is certified that error appears in the above-identified patent and that said Letters Patent is hereby corrected as shown below:

In the Claims

In Column 19, Line 25, in Claim 1, delete "input" and insert -- input, --, therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*